United States Patent [19]

Hamaguchi et al.

[11] Patent Number: 4,906,499
[45] Date of Patent: Mar. 6, 1990

[54] HIGH DENSITY INFORMATION RECORD MEDIUM COMPRISING A POLYMER MATERIAL HAVING A LUBRICANT UNIFORMLY DISPERSED THEREIN

[75] Inventors: Toshiaki Hamaguchi; Kazuhira Namikawa; Toshio Akai; Mutsuaki Nakamura; Akio Kuroda, all of Yokohama; Akio Hata; Noriki Fujii, both of Shinnanyo, all of Japan

[73] Assignees: Victor Company of Japan, Ltd., Yokoyama; Tokuyama Sekisui Industry Corporation, Limited, Osaka, both of Japan

[21] Appl. No.: 219,878

[22] Filed: Jul. 5, 1988

Related U.S. Application Data

[63] Continuation of Ser. No. 105,981, Oct. 7, 1987, abandoned, which is a continuation of Ser. No. 794,784, Oct. 31, 1985, abandoned.

[30] Foreign Application Priority Data

Nov. 2, 1984 [JP]   Japan ................................ 59-230246

[51] Int. Cl.$^4$ ........................ B32B 3/00; B32B 27/00; B32B 67/18; B32B 27/30
[52] U.S. Cl. ........................................ 428/64; 428/65; 252/511
[58] Field of Search ..................... 428/64, 65; 252/511

[56] References Cited

U.S. PATENT DOCUMENTS

| | | |
|---|---|---|
| 2,127,381 | 8/1938 | Herrmann et al. . |
| 4,125,654 | 11/1978 | Kaneko et al. ................... 428/64 |
| 4,216,970 | 8/1980 | Wang et al. ...................... 428/65 |
| 4,241,120 | 12/1980 | Datta et al. ...................... 428/65 |
| 4,342,659 | 8/1982 | Wang et al. ..................... 252/49.6 |
| 4,396,660 | 8/1983 | Hata et al. ....................... 252/511 |
| 4,465,615 | 8/1984 | Hata et al. ....................... 252/511 |
| 4,547,545 | 10/1985 | Hamaguchi et al. ............. 524/269 |
| 4,548,739 | 10/1985 | Nakamura et al. ............... 252/511 |

FOREIGN PATENT DOCUMENTS

| | | |
|---|---|---|
| 3414053 | 10/1984 | Fed. Rep. of Germany . |
| 167151 | 10/1982 | Japan . |
| 56243 | 4/1983 | Japan . |
| 2098221 | 11/1982 | United Kingdom . |
| 2138991 | 10/1984 | United Kingdom . |

Primary Examiner—George F. Lesmes
Assistant Examiner—Elizabeth M. Cole
Attorney, Agent, or Firm—Lowe, Price, LeBlanc, Becker & Shur

[57] ABSTRACT

An information signal record medium of an electrostatic capacitance type in which a signal information is recorded as geometric variations is described. The medium is made of a conductive resin composition which comprises a vinyl chloride resin and 5 to 30 parts by weight of conductive particles based on 100 parts by weight of the vinyl chloride resin. The vinyl chloride resin is obtained by polymerizing at least one monomer for the vinyl chloride resin in which from 0.2 to 1 parts by weight of a lubricant per 100 parts by weight of the vinyl chloride resin is dissolved.

2 Claims, No Drawings

HIGH DENSITY INFORMATION RECORD MEDIUM COMPRISING A POLYMER MATERIAL HAVING A LUBRICANT UNIFORMLY DISPERSED THEREIN

This application is a continuation of application Ser. No. 105,981, now abandoned, filed Oct. 7, 1987, which is a continuation of application Ser. No. 794,784, filed Oct. 31, 1985, now abandoned.

BACKGROUND OF THE INVENTION

1. Field of the Invention

This invention relates to high density formation record media of an electrostatic capacitance type, such as video or digital audio discs, on which an information signal is recorded as geometric variations.

2. Description of the Prior Art

In certain information playback systems of the electrostatic capacitance type, an information signal is recorded as geometric variations by forming pits in a spiral plane or groove or in concentric planes or grooves, thereby obtaining high density information records such as video or digital audio discs. The individual pits of the record are very small and are arranged in a very high density. When the geometric variations are traced with a pickup stylus such as a diamond having an electrode, capacitive variations are established between the stylus and the record according to the geometric variations, so that the recorded information signal can be played back or reproduced.

Several kinds of information signal records of the electrostatic capacitance type have been proposed for use in the above type of electrostatic capacitance playback system. In one such record medium, a metal electrode is provided on one or both surfaces of a record substrate on which geometric variations have been press-molded according to an information signal. This permits an electrostatic capacitance to be established between the record electrode and an electrode of a pickup stylus according to the information signal. More particularly, the record substrate, on which pits are formed as desired, is covered with a metallic thin film having several hundred angstroms in thickness, and also with a several hundred angstrom thick dielectric layer overlaying the metallic film. This dielectric layer serves to prevent short circuiting of the electrodes and to increase the dielectric constant between the electrodes. However, the record of this type needs a number of fabricating steps including a press molding of the record substrate, steps of depositing the metallic thin film and the dielectric layer, and the like. Thus, the fabrication is complicated and troublesome with the need of a relatively large-scale manufacturing apparatus. Thus, the production cost becomes very high.

Another type of information record medium is known. This medium is obtained using conductive resin compositions which comprise polyvinyl chloride resins, lubricants and several tens percent of carbon black. The conductive composition is press-molded so that an information signal is recorded as geometric variations. In this type of recording medium, an electrostatic capacitance is established between the electrode of a pickup stylus and the record itself. Thus, the step of depositing a metallic thin film on the substrate is not necessary. In addition, because fine particles of carbon black are individually covered with the resin, the dielectric film is not necessary as well. Thus, this record medium can be simply manufactured at a relatively low cost.

However, the record medium has the serious problem that when it is set in a recording and reproducing apparatus and reproduced over a long time, the medium surface is worn by means of a playback stylus which is in contact with the surface. As a consequence, the pits may deform, causing the electrostatic capacitance to be varied. Thus, an accurate reproduction cannot be expected. Especially, when a picture frame is frozen, the playback stylus is brought to contact with a certain position under a pressure of 400 to 500 kg/cm$^2$ at a rate of 15 cycles/second, so that the medium surface is worn to a substantial extent.

In order to solve the above problem, there has been proposed a recording medium in which not only thermal stabilizers and processing aids, but also lubricants are added during mixing of thermoplastic resins and carbon black and the resulting conductive composition is used to make the medium. This medium is intended to improve the wear resistance by addition of lubricants to the conductive resin composition. However, the mere addition of lubricants during the mixing is not effective because carbon black having a large surface area is contained in large amounts, so that the stabilizers and processing aids have to be used in large amounts. In addition, in order to improve the wear resistance, large amounts of lubricants are also required. The total amount of these additives exceeds an amount which enables a vinyl chloride resin to contain such additives therein. This means that when the composition is press-molded, the various additives are plated out and deposit on the metal mold. This will considerably lower the productivity of the medium.

SUMMARY OF THE INVENTION

It is accordingly an object of the present invention to provide information record mediums of an electrostatic capacitance type which have an improved wear resistance and are formed from conductive resin compositions comprising vinyl chloride resins and carbon black particles with reduced amounts of lubricants.

It is another object of the invention to provide information record mediums which make use of specific types of vinyl chloride resins suitable for improving the wear resistance of the mediums.

The information record medium of the present invention is of an electrostatic capacitance type in which a signal information is recorded as geometric variations. The medium consists essentially of a conductive resin composition which comprises a vinyl chloride resin, and 5 to 30 parts by weight of conductive particles based on 100 parts by weight of the vinyl chloride resin. The invention is characterized in that the vinyl chloride resin is obtained by polymerizing vinyl chloride monomer, with or without at least one monomer copolymerizable with the vinyl chloride monomer, having dissolved therein from 0.2 to 1 part by weight of a lubricant per 100 parts by weight of the vinyl chloride resin.

In the present invention, thermoplastic vinyl chloride resins have at least one lubricant uniformly dispersed when polymerized. The resultant medium has a much improved wear resistance without involving any plate-out phenomenon during the molding operation though the lubricant is used only in small amounts.

DETAILED DESCRIPTION AND PREFERRED EMBODIMENTS OF THE INVENTION

The conductive resin composition used to make an information record medium of an electrostatic capacitance type according to the invention consists essentially of a vinyl chloride resin and conductive particles.

We found that when vinyl chloride resins which were obtained by polymerizing a vinyl chloride monomer, with or without a copolymerizable monomer, having a lubricant dissolved therein, were used to make a record medium of the type discussed before, the wear resistance could be much improved using much smaller amounts of the lubricant. Presumably, this is because when the lubricant is dissolved prior to polymerization of vinyl chloride monomers, it can more uniformly be dispersed in the resultant resin than in the case where the lubricant is merely blended mechanically with a vinyl chloride resin.

The vinyl chloride resins suitable for the purposes of the present invention may be vinyl chloride homopolymer and vinyl chloride copolymers with other copolymerizable monomers ordinarily used for these purposes. Examples of the copolymers include vinyl chloride-vinyl acetate copolymers, vinyl chloride-ethylene copolymers, vinyl chloride-propylene copolymers, vinyl chloride-alkyl acrylate copolymers, graft copolymers of vinyl chloride monomer with acrylonitrile-styrene copolymers or ethylene-vinyl acetate copolymers, vinyl chloride-alpha-olefin copolymers, vinyl chloride-vinyl alcohol copolymers and the like.

In the practice of the invention, these vinyl chloride resins should be prepared by first dissolving a lubricant in a monomer solution for the vinyl chloride resin and subjecting the resultant solution to polymerization under conditions well known in the art. The present invention is characterized in that the lubricant is dissolved in the monomer solution prior to the polymerization. The polymerization of vinyl chloride monomer with or without a copolymerizable monomer may be carried out by several methods including a suspension polymerization, bulk polymerization and emulsion polymerization. Of these, the suspension polymerization is preferred because of the high quality and the ease in control of polymerization conditions. The preparation by suspension polymerization of a specific type of vinyl chloride resin will be particularly described hereinafter.

The lubricants added to a monomer solution may be any lubricants provided that they can be dissolved in the solution. Examples of the lubricants include organopolysiloxanes such as dimethylpolysiloxane and derivatives thereof, and a number of other types of organopolysiloxanes, fatty acids having from 8 to 24 carbon atoms, fatty acid esters of monocarboxylic acids having from 8 to 24 carbon atoms and mono, di, trihydric alcohols having from 1 to 24 carbon atoms, and the like. Typical organopolysiloxanes are described, for example, in U.S. Pat. No. 4,216,970 and Japanese Laid-open Patent Application No. 55-38699, which are incorporated herein by reference. These lubricants may be used singly or in combination in a total amount of from 0.2 to 1 part, preferably from 0.3 to 0.75 part by weight per 100 parts by weight of the final vinyl chloride resin. Preferably, dimethylpolysiloxane is used.

In the preparation of the vinyl chloride resin, it is desirable to remove impurities or foreign matters from starting materials, water, stabilizers, polymerization initiators and the like. Although lubricants are dissolved in a monomer solution, the polymerization conditions ordinarily used may be employed in order to carry out the polymerization of the monomer solution. The resultant granules or particles of vinyl chloride resin contain the lubricant which is very uniformly dispersed throughout the granules.

The conductive particles may be carbon black particles and other conductive metal powders such as Cu, Ni and the like. Of these, carbon black is preferred because of the availability and inexpensiveness thereof. The carbon black particles may be any commercially available ones. In general, carbon black comprises various impurities including ashes, Ca, Na, K, Fe, Ni, Al, Cu, Zn, Mg, V and the like. Preferably, these impurities should be removed from carbon black, for example, by washing.

Aside from these essential components, stabilizers such as metallic soaps including calcium stearate, organic tin compounds such as dibutyl tin esters and the like, lubricants such as organopolysiloxanes, higher alcohols, fatty acids, esters thereof and polysaccharides may be added to the conductive resin composition as usual, in amounts not impeding the effects of the invention.

For the fabrication of information record mediums, the essential components described above along with other additives, if necessary, are mixed in a high speed mixer such as the Henschel mixer by which the particles are sufficiently dispersed throughout the composition. Then, the mixture is melted in a highly kneadable extruder and pelletized, followed by pressing by a press machine to obtain video or audio discs as desired.

The present invention is described in more detail by way of examples and comparative examples.

Preparatory Example

This example describes preparation of a lubricant-containing thermoplastic resin.

A 600 liter autoclave having a jacket and an agitator was used to provide a lubricant-containing graft copolymer in the form of particles. The autoclave was filled with methylene chloride, heated to 40° C. and agitated for 1 hour to remove deposited scale therefrom. The methylene chloride was removed and pressurized water of 60 kg/cm$^2$G was charged into the autoclave to completely remove the scale therefrom. Thereafter, ion-exchanged water which had been passed through a filter having a mesh size of 0.5 μm, was charged into the autoclave for washing.

Ion-exchanged water used for the polymerization was also passed through a filter of the same type as mentioned above and vinyl chloride monomer was passed through a filter having a mesh size of 1 μm. A copolymer of ethylene and vinyl acetate used to graft-copolymerize the vinyl chloride monomer was washed sufficiently with water which had been passed through a filter having a mesh size of 0.5 μm, or was passed through a filter having a mesh size of 1 μm after dissolution in vinyl chloride monomer.

A lubricant was used after passage through a filter having a mesh size of 0.5 μm.

Sodium polyacrylate and another suspension stabilizer used for suspension polymerization were, respectively, dissolved in the filtered ion-exchanged water in amounts of 0.1 wt % and 2 wt %. A polymerization initiator was used after passage through a 1 μm mesh filter.

The suspension polymerization for obtaining the lubricant-containing graft polymer was conducted in a usual manner and unreacted vinyl chloride monomer was collected when the polymerization reaction rate reached 80%. More particularly, 4.9 kg of ethylene/vinyl acetate copolymer and 200 kg of vinyl chloride monomer were charged into the autoclave along with 600 g of a poval stabilizer and 60 g of sodium polyacrylate dissolved as mentioned above and 120 g of a polymerization initiator. The total amount of the ion-exchanged water was 290 kg. The reaction was conducted at a temperature of 74° C. for 8 hours. The resultant resin had a degree of polymerization of about 480 and a content of the ethylene/vinyl acetate copolymer of 3%. The yield was found to be 15 kg.

A lubricant should preferably be added to a polymerizable monomer prior to the polymerization reaction. The lubricant-containing thermoplastic resin may be obtained if the lubricant is added prior to removal of unreacted monomer.

The resultant reaction product was discharged through a 42 mesh gauze into a 1000 liter container which had been washed with the above-mentioned filtered ion-exchanged water and had a withdrawal nozzle and an agitator.

Part of the resultant slurry was placed in a centrifugal dehydrator to obtain a cake. The dehydrator was placed in a chamber which had been pressurized with air passed through a HEPA filter. The thus obtained cake was mixed with 3 volumes of the filtered ion-exchanged water with respect to the vinyl chloride resin, thereby obtaining a slurry.

The slurry was agitated for 1 hour, followed by repeating the above procedure two more times and dehydration to obtain a cake. The cake was dried while care was paid to prevention of dust from entering into the cake. Thus, particles of a lubricant-containing vinyl chloride resin, which was a graft polymer between the ethylene/vinyl acetate copolymer and vinyl chloride, where obtained.

The above procedure was repeated using different types and contents of lubricants with varying viscosities. The characteristic properties of the resultant graft polymers are shown in Table 1 below.

TABLE 1-1

| No. | Lubricant Kind | Amount(g) | Content of Lubricant (wt %)[*1] | Apparent Density of Resin |
|---|---|---|---|---|
| 1 | RES-421[*2] (20 cps)[*3] | 400 | 0.25 | 0.515 |
| 2 | RES-421[*2] (20 cps)[*3] | 800 | 0.50 | 0.490 |
| 3 | RES-421[*2] (20 cps)[*3] | 1200 | 0.75 | 0.490 |
| 4 | RES-421[*2] (20 cps)[*3] | 1600 | 1.00 | 0.498 |
| 5 | KF-96[*4] (350 cps) | 1200 | 0.75 | 0.506 |
| 6 | KF-96 (100 cps) | 1200 | 0.75 | 0.499 |
| 7 | KF-96 (50 cps) | 1200 | 0.75 | 0.497 |
| 8 | KF-96 (10 cps) | 1200 | 0.75 | 0.505 |
| 9 | RES-210[*5] (31 cps) | 320 | 0.20 | 0.507 |
| 10 | — | 0 | 0 | 0.520 |

| Screen Pass Rate of Resin Particles (%) | | | | |
|---|---|---|---|---|
| 42 mesh | 60 mesh | 100 mesh | 150 mesh | 200 mesh |
| 100 | 99.6 | 99.2 | 98.0 | 83.6 |
| 100 | 99.6 | 99.4 | 98.4 | 73.6 |
| 100 | 99.6 | 99.4 | 96.8 | 76.8 |
| 100 | 99.6 | 99.2 | 96.4 | 52.0 |
| 99.8 | 99.6 | 99.4 | 97.6 | 72.0 |
| 99.8 | 99.6 | 99.4 | 98.4 | 82.2 |
| 99.8 | 99.6 | 99.4 | 99.0 | 63.6 |
| 99.8 | 99.6 | 99.4 | 98.4 | 82.6 |
| 99.8 | 99.6 | 98.8 | 96.6 | 86.0 |
| 100 | 99.9 | 99.5 | 98.2 | 83.8 |

[*1] The content of lubricant is based on resin.
[*2] RES-421 means dimethylpolysiloxane, made by Shinestsu Chem. Ind. Co., Ltd.
[*3] The values in parentheses indicate a viscosity at 20° C.
[*4] KF-96 means dimethylpolysiloxane, made by Shinetsu Chem. Ind. Co., Ltd.
[*5] RES-210 means a fatty acid and glycerine ester, made by Riken Vitamin Co., Ltd.

EXAMPLES 1–9

One hundred parts by weight of each of the vinyl chloride resin Nos. 1 to 9 indicated in Table 1, 5 parts by weight of a dibutyl tin mercapto stabilizer (RES-1, by Sankyo Organic Synthesis Co., Ltd.), 2.0 parts by weight of an ester of a fatty acid and glycerine having a hydroxyl value of 4 as a process aid (RES-210, by Riken Vitamins Co., Ltd.), and 0.5 parts by weight of a fatty acid and alcohol ester lubricant having a hydroxyl value of 5 (RES-310, By Kao Soaps Co., Ltd.) were placed in the Henschel mixer and blended to an extent that the temperature reached 110° C., followed by blending at a low speed so that the temperature was lowered down to 70° C. To the mixture was further added 20 parts by weight of conductive carbon black (CSX-150A, by Cabot Co., Ltd. of U.S. A.), whose temperature was raised to 110° C. The mixture was blended at high speed for 15 minutes and cooled down to room temperature.

Thereafter, the mixture was pelletized by the use of a kneader PR-46, by Buss Co., Ltd. of Switzerland and the resulting pellets were passed through a metal detector and a magnet to remove metal-containing pellets, followed by pressing by means of a video disc press machine to obtain video discs of the electrostatic capacitance type.

COMPARATIVE EXAMPLE 1

The general procedure of Example 1 was repeated using the vinyl chloride resin No. 10 in Table 1, thereby obtaining video discs.

COMPARATIVE EXAMPLE 2

The general procedure of Example 1 was repeated except that 100 parts by weight of the vinyl chloride resin No. 10 in Table 1, 5 parts by weight of RES-1, 1 part by weight of RES-421, 2 parts by weight of RES-210 and 0.5 parts by weight of RES-310 were used, thereby obtaining video discs.

The video discs obtained in Examples 1 to 9 and Comparative Examples 1 and 2 were each mounted in a recording and reproducing apparatus and subjected to measurement of a degree of deterioration of Y-S/N. In this measurement, each disc was frame-frozen or still-reproduced for 1 and 2 hours while measuring the Y-S/N value of each disc at gray 50 IRE recorded at a position where it took 54 minutes from the outermost track of the video disc. The degree of deterioration of the signal-to-noise ratio was determined such that ten to twelve video discs of the respective examples and comparative examples were provided; and each disc was tested three times while changing the track every 2 hours. The tested discs whose degree of deterioration was within 3 dB were determined as acceptable, whereas discs whose degree of deterioration was over 3 dB or which involved the jumping of the stylus were determined as unacceptable.

The degree of deterioration is shown in Table 2 as acceptance rate by percent, along with moldability and the presence or absence of plateout on the stamper surface.

TABLE 2

| | Acceptance Rate by Percent | | | |
| | 1 hour | 2 hours | Moldability | Plateout |
|---|---|---|---|---|
| Ex. | | | | |
| 1 | 60 | 40 | good | no |
| 2 | 90 | 80 | good | no |
| 3 | 100 | 100 | good | no |
| 4 | 100 | 100 | good | no |
| 5 | 95 | 80 | moderate | slight |
| 6 | 100 | 95 | good | no |
| 7 | 100 | 100 | good | no |
| 8 | 100 | 100 | good | no |
| 9 | 100 | 90 | moderate | no |
| Com. Ex. | | | | |
| 1 | 20 | 0 | good | no |
| 2 | 100 | 90 | moderate | yes |

As will be apparent from the above results, the video discs of the present invention are more resistant to wear. In addition, the moldability is better for the present invention without involving an undesirable plateout phenomenon.

What is claimed is:

1. An information signal record medium of an electrostatic capacitance type in which signal information is recorded as geometric variations, the medium consisting essentially of a conductive resin composition which comprises a vinyl chloride resin, from 5 to 30 parts by weight of conductive carbon black particles based on 100 parts by weight of the vinyl chloride resin, and an organic tin stabilizer for the conductive resin composition, said vinyl chloride resin being obtained by polymerizing at least one monomer for the vinyl chloride resin, in which monomer from 0.2 to 1 part by weight of a dimethylpolysiloxane lubricant per 100 parts by weight of the vinyl chloride resin is dissolved.

2. An information signal record medium according to claim 1, wherein said dimethylpolysiloxane lubricant is dissolved in the monomer in an amount of from 0.3 to 0.75 parts by weight per 100 parts by weight of said vinyl chloride resin.

* * * * *